(12) United States Patent
Yarlagadda (10) Patent No.: US 12,038,571 B2
(45) Date of Patent: Jul. 16, 2024

(54) SCALABLE AND EFFICIENT WHOLE SLIDE IMAGE READER FOR DEEP LEARNING AND VIEWER APPLICATIONS

(71) Applicant: MEMORIAL SLOAN KETTERING CANCER CENTER, New York, NY (US)

(72) Inventor: Dig Vijay Kumar Yarlagadda, New York, NY (US)

(73) Assignee: Memorial Sloan Kettering Cancer Center, New York, NY (US)

( * ) Notice: Subject to any disclaimer, the term of this patent is extended or adjusted under 35 U.S.C. 154(b) by 423 days.

(21) Appl. No.: 17/608,889

(22) PCT Filed: May 6, 2020

(86) PCT No.: PCT/US2020/031662
§ 371 (c)(1),
(2) Date: Nov. 4, 2021

(87) PCT Pub. No.: WO2020/227401
PCT Pub. Date: Nov. 12, 2020

(65) Prior Publication Data
US 2022/0301098 A1     Sep. 22, 2022

Related U.S. Application Data

(60) Provisional application No. 62/844,706, filed on May 7, 2019.

(51) Int. Cl.
*G06V 10/25*     (2022.01)
*G02B 21/36*     (2006.01)
(Continued)

(52) U.S. Cl.
CPC ......... *G02B 21/367* (2013.01); *G02B 21/365* (2013.01); *G06T 1/20* (2013.01);
(Continued)

(58) Field of Classification Search
CPC .. G02B 21/367; G02B 21/365; G02B 21/002; G06T 1/20; G06T 1/60; G06T 7/0012;
(Continued)

(56) References Cited

U.S. PATENT DOCUMENTS 7,826,649 B2    11/2010    Crandall et al.
9,286,657 B1     3/2016    Thorup, Jr.
(Continued)

FOREIGN PATENT DOCUMENTS

WO    WO-2016/035094 A1    3/2016

OTHER PUBLICATIONS

Vu et al., "Methods for Segmentation and Classification of Digital Microscopy Tissue Images", Frontiers in Bioengineering and Biotechnology, Apr. 2019, pp. 1-15, vol. 7, Article 53.
(Continued)

*Primary Examiner* — Chuong A Ngo
(74) *Attorney, Agent, or Firm* — Foley & Lardner LLP (57) ABSTRACT

Described are embodiments of a scalable system for processing whole slide images (WSIs). The system may heavily utilize parallel processing on both central processing units (CPUs) and graphics processing units (GPUs). Images may be decoded on a GPU. Reads may be unbuffered with a low memory footprint. Compute Unified Device Architecture (CUD A) operations may be employed to eliminate many inefficiencies in traditional WSI processing libraries.

20 Claims, 11 Drawing Sheets

(51) Int. Cl.
   *G06T 1/20*      (2006.01)
   *G06T 1/60*      (2006.01)
   *G06V 20/69*     (2022.01)

(52) U.S. Cl.
   CPC ............... *G06T 1/60* (2013.01); *G06V 10/25* (2022.01); *G06V 20/698* (2022.01)

(58) Field of Classification Search
   CPC . G06T 2207/20081; G06T 2207/20104; G06T 2207/10056; G06T 2207/20021; G06T 2207/20084; G06T 2207/30024; G06V 10/25; G06V 20/698; G06F 18/24143
   See application file for complete search history.

(56) References Cited

U.S. PATENT DOCUMENTS

| | | |
|---|---|---|
| 2013/0022268 A1 | 1/2013 | Kishima |
| 2017/0094095 A1 | 3/2017 | Crandall et al. |
| 2017/0161891 A1* | 6/2017 | Madabhushi ....... G06F 18/2411 |
| 2018/0300246 A1 | 10/2018 | Sakthivel et al. |
| 2019/0114770 A1 | 4/2019 | Song et al. |
| 2020/0250398 A1* | 8/2020 | Courtiol ................ G06T 7/0012 |
| 2022/0058839 A1* | 2/2022 | Chang .................... G06N 3/047 |

OTHER PUBLICATIONS

International Search Report & Written Opinion of the International Searching Authority issued in PCT Application No. PCT/US2020/031662, mailed Aug. 3, 2020.

George Teodoro et al: "High-throughput Analysis of Large Microscopy Image Datasets on CPU-GPU Cluster Platforms", Parallel &Distributed Processing (IPDPS), 2013 IEEE 27th International Symposium On, IEEE, May 20, 2013 (May 20, 2013), pp. 103-114, XP032444437.

Lopez Barron Daniel E et al: "Scalable storage of whole slide images and fast retrieval of tiles using Apache Spark", Progress in Biomedical Optics and Imaging SPIE—International Society for Optical Engineering, Bellingham, WA, US, vol. 10581, Mar. 6, 2018 (Mar. 6, 2018), pp. 1058113-1058113, XP060104306.

* cited by examiner

| Block size (Kilobytes) | Performance (Gigabytes/s) |
|---|---|
| 0.5 | 1.2 |
| 1 | 2.1 |
| 2 | 3.2 |
| 4 | 4.4 |
| 8 | 5.2 |
| 16 | 5.4 |
| 32 | 5.8 |

SCALABLE AND EFFICIENT WHOLE SLIDE IMAGE READER FOR DEEP LEARNING AND VIEWER APPLICATIONS

CROSS-REFERENCE TO RELATED APPLICATIONS

This application is a National Stage Entry of PCT Application No. PCT/US2020/031662, filed May 6, 2020, which further claims the benefit of and priority to U.S. Provisional Patent Application No. 62/844,706, filed May 7, 2019, the contents of which are incorporated herein by reference in their entireties.

BACKGROUND

Pathology involves examination of body tissue for diagnostic or forensic purposes, such as examination of glass slides of tissue samples using a light microscope. Digital pathology involves the acquisition, management, and interpretation of digitized pathology data for such purposes as diagnosis, training, research, and peer review. Digitized pathology data can be generated by scanning glass slides of tissue samples to obtain digital images that can be viewed on a display screen, shared with colleagues, and studied for patterns.

SUMMARY

In a first aspect, various embodiments may relate to a method that may comprise: receiving, by a system comprising a central processing unit (CPU) and a graphics processing unit (GPU), a request to process a data set of whole slide images and a plurality of regions of one or more images; initializing the CPU and GPU to process the data set by: retrieving, by the system, a first image of the one or more images; generating, by the system, a mapping of the first image, the mapping comprising a set of tiles and, for each tile, a position indicator and a memory size indicator; and identifying, by the system, from the request, an indication of a region of interest (ROI) of the image to be processed, the ROI comprising a subset of the set of tiles; generating, by the CPU, a plurality of threads to read tiles and queue the read tiles to be decoded by the GPU; for each tile to be read, identifying a size of the tile and allocating, in the memory of the CPU, a portion of the memory corresponding to the size of the tile; generating, for the GPU, a plurality of threads to decode the queue of read tiles generated by the CPU; decoding, by the GPU, each read tile included in the queue of read tiles according to a prefetching policy; storing, by the GPU, in a second queue, for each decoded tile, a corresponding tensor; and providing, by the GPU, to a viewer or a training system, the second queue including the plurality of decoded tiles.

In various embodiments the plurality of threads are generated to read the tiles in an unbuffered manner. Reading the tiles in the unbuffered manner may comprise allocating only the portion of the memory corresponding to the size of the tile (rather than, e.g., a fixed amount of memory or a larger amount of memory). Identifying the size of the tile may comprise identifying the size of the tile based on a corresponding memory size indicator in the mapping. The first image may be retrieved from a scanner. The scanner may comprise an imaging device and a microscope. The image may be a digital image, captured using the imaging device and the microscope, of a slide with tissue of a subject.

In another aspect, various embodiments relate to a system comprising a central processing unit (CPU), a graphics processing unit (GPU), and a memory with executable instructions configured to cause the system to: receive, by the CPU, a request to process a data set of whole slide images and a plurality of regions of one or more images; initialize the CPU and GPU to process the data set by: retrieving a first image of the one or more images; generating a mapping of the first image, the mapping comprising a set of tiles and, for each tile, a position indicator and a memory size indicator; and identifying, from the request, an indication of a region of interest (ROI) of the image to be processed, the ROI comprising a subset of the set of tiles; generate, by the CPU, a plurality of threads to read tiles and queue the read tiles to be decoded by the GPU; for each tile to be read, identify a size of the tile and allocate, in the memory of the CPU, a portion of the memory corresponding to the size of the tile; generate, for the GPU, a plurality of threads to decode the queue of read tiles generated by the CPU; decode, by the GPU, each read tile included in the queue of read tiles according to a prefetching policy; store, by the GPU, in a second queue, for each decoded tile, a corresponding tensor; and provide, by the GPU, to a viewer or a training system, the second queue including the plurality of decoded tiles.

In another aspect, various embodiments relate to non-transitory computer-readable storage medium comprising computer-executable instructions configured to cause a system comprising a central processing unit (CPU) and a graphics processing unit (GPU) to: receive, by the CPU, a request to process a data set of whole slide images and a plurality of regions of one or more images; initialize the CPU and GPU to process the data set by: retrieving a first image of the one or more images; generating a mapping of the first image, the mapping comprising a set of tiles and, for each tile, a position indicator and a memory size indicator; and identifying, from the request, an indication of a region of interest (ROI) of the image to be processed, the ROI comprising a subset of the set of tiles; generate, by the CPU, a plurality of threads to read tiles and queue the read tiles to be decoded by the GPU; for each tile to be read, identify a size of the tile and allocating, in the memory of the CPU, a portion of the memory corresponding to the size of the tile; generate, for the GPU, a plurality of threads to decode the queue of read tiles generated by the CPU; decode, by the GPU, each read tile included in the queue of read tiles according to a prefetching policy; store, by the GPU, in a second queue, for each decoded tile, a corresponding tensor; and provide, by the GPU, to a viewer or a training system, the second queue including the plurality of decoded tiles.

In another aspect, various potential embodiments of the disclosure may relate to a method that may comprise: retrieving, by a system comprising a central processing unit (CPU) and a graphics processing unit (GPU), an image; generating, by the system, a mapping of the image, the mapping comprising a set of tiles and, for each tile, a position indicator and a memory size indicator; receiving, by the system, an indication of a region of interest (ROI) of the image to be viewed using a viewer, the ROI comprising a subset of the set of tiles; generating, by the system using both the CPU and the GPU: a batch of tensors, wherein generating the batch of tensors comprises: (i) unbuffered reading of native forms of the subset of tiles; (ii) joining of the native subset of tiles to generate the ROI; and (iii) batch decoding and indexing of the subset of tiles in the ROI; providing, by the system, the batch of tensors to a model for training the model based on the ROI.

In various embodiments, each of steps (i), (ii), and (iii) may be performed in parallel on both the CPU and the GPU. The batch decoding may be performed using only the GPU and not the CPU.

In another aspect, various potential embodiments of the disclosure may relate to a method that may comprise: retrieving, by a device including a central processing unit and a graphics processing unit, a digital image of a glass slide; generating, by the device, a mapping for the digital image such that the digital image maps to a set of tiles and, for each tile, the mapping comprise a position and a number of bytes; receiving, by device, a request to read a region of the digital image; determining, by the device, that the region comprises a subset of the set of tiles; performing, by the device, in parallel and using both the central processing unit and the graphics processing unit, a set of steps comprising: i) reading into memory the subset of tiles in native form; ii) joining of the native files into the region; and iii) batch decoding of the subset of tiles; generating, by the device, responsive to the performance of the set of steps, a batch of tensors; and providing, by the device, the batch of tensors to a model for training the model based on the region of the image.

In various embodiments, the reading of each tile in the subset of tiles of step (i) is unbuffered. The unbuffered reading of step (i) may be based on the numbers of bytes in the mapping. The joining of native files into the region of step (ii) may be performed without decoding of the tiles in the subset of tiles. Step (iii) may further comprise indexing, by the device, of the region of the digital image.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

Whole slide images (WSIs) seek to emulate the use of light microscopes in the study of glass slides. A scanner is used to digitize glass slides to generate a digital image (a "digital slide" or "virtual slide"). A virtual slide viewer can be used to view and analyze digital files with the digital images generated using the scanners. WSI scanners may include a microscope with lens objectives, a light source (e.g., bright field and/or fluorescent), a motorized mechanism to load and move glass slides, and one or more digital cameras for image capture. For tile-based scanning, a motorized slide stage can be used to capture a large number of square image frames ("tiles") that can be assembled into one seamless image. Sections of slides having shapes other than squares can be scanned to generate other types of frames that can be stitched into one image.

One of the key challenges in building an application using WSIs is their large size. A typical WSI contains one to five billion pixels and occupies 100 megabytes (MB) to 1.5 gigabytes (GB) of disk space. In contrast, a typical image contains one to ten million pixels and occupies 100 kilobytes (KB) to 5 MB of disk space. WSIs thus take more time to read and demand high computational overhead for processing. Creating and studying large WSI datasets for various research and clinical purposes are thus challenging.

Figure 1:
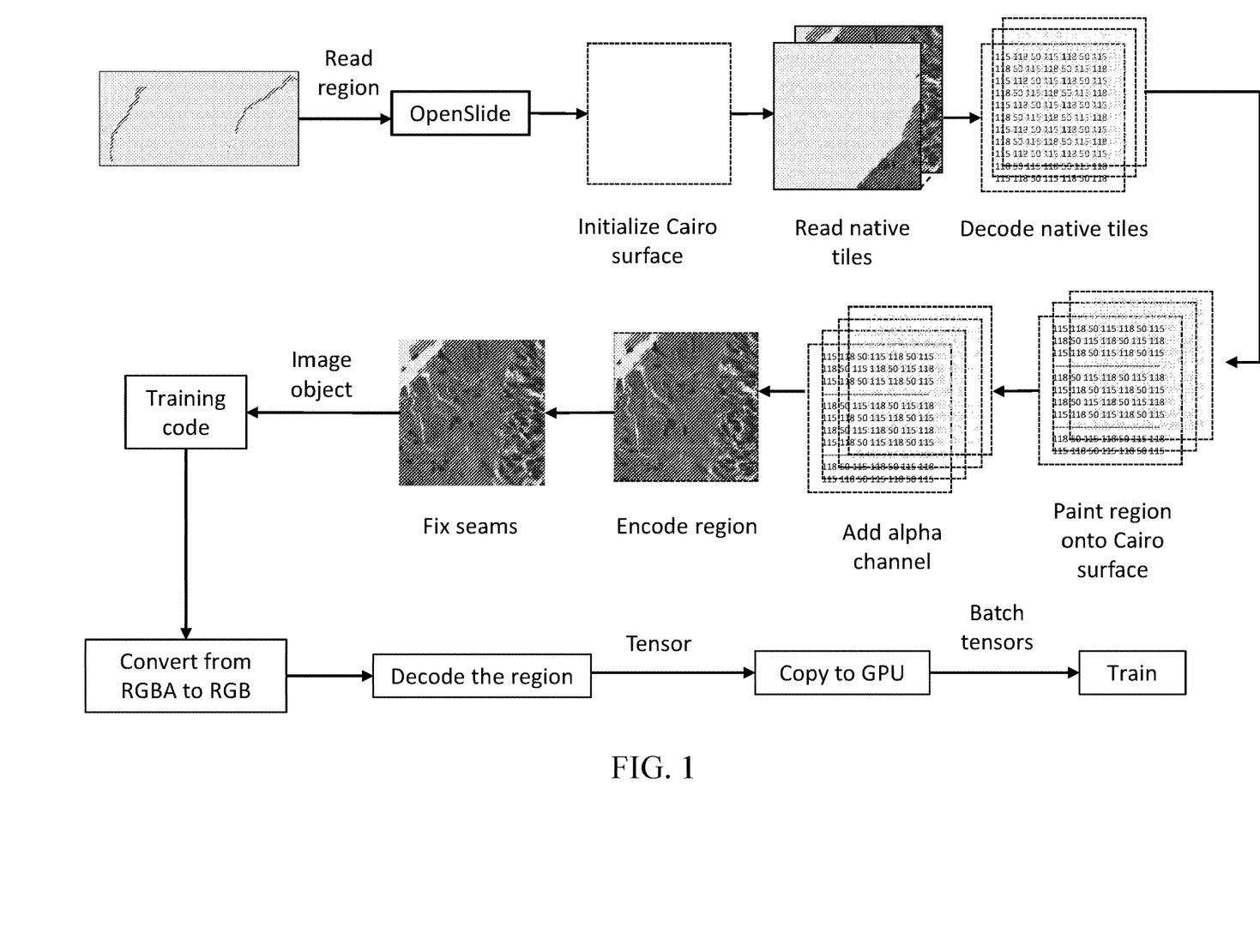
FIG. 1 illustrates the OpenSlide's reading of whole slide images (WSIs).

OpenSlide is a C library that provides an interface to read WSIs. Referring to FIG. 1, a WSI is organized into native tiles of fixed dimensions (e.g., 240 pixels by 240 pixels). When a small region of a WSI is selected, OpenSlide converts the region into a series of native tiles to be read. The native tiles are decoded from an image format (e.g., JPEG, PNG, BMP) into a format understandable by the computer (e.g., organized into data structures such as arrays and tensors), and painted onto an empty blank Cairo surface. It is noted that using nvJPEG for decoding here is not going to improve the speed; using nvJPEG on regions created by OpenSlide will not improve speed for deep learning applications, as OpenSlide region creation itself is the bottleneck. A transparent (alpha) channel is added, and the tiles are re-encoded into an image format. The decoding and re-encoding can introduce blurs and artifacts, and some correction can be performed. WSIs can be created in different image formats by scanners from different vendors. OpenSlide is meant to be a vendor-agnostic tool for WSI. To obtain a single standard image format from these different WSI formats, OpenSlide decodes every tile from every WSI and encodes it into one specific standard chosen by OpenSlide. Every tile must be decoded before a computer program such as a deep learning algorithm could process it.

Deep learning algorithms have been used to analyze WSIs; they are developed on large computer clusters and they utilize graphical processing units (GPUs) to speed up computation. A typical training of an algorithm involves loading a training example from disk into random access memory (RAM), followed by loading of a copy into a GPU and training of a deep learning model. A GPU can process images and train models orders of magnitude faster than OpenSlide can read WSIs, so this resulted in a bottleneck for WSI applications.

Figure 2:
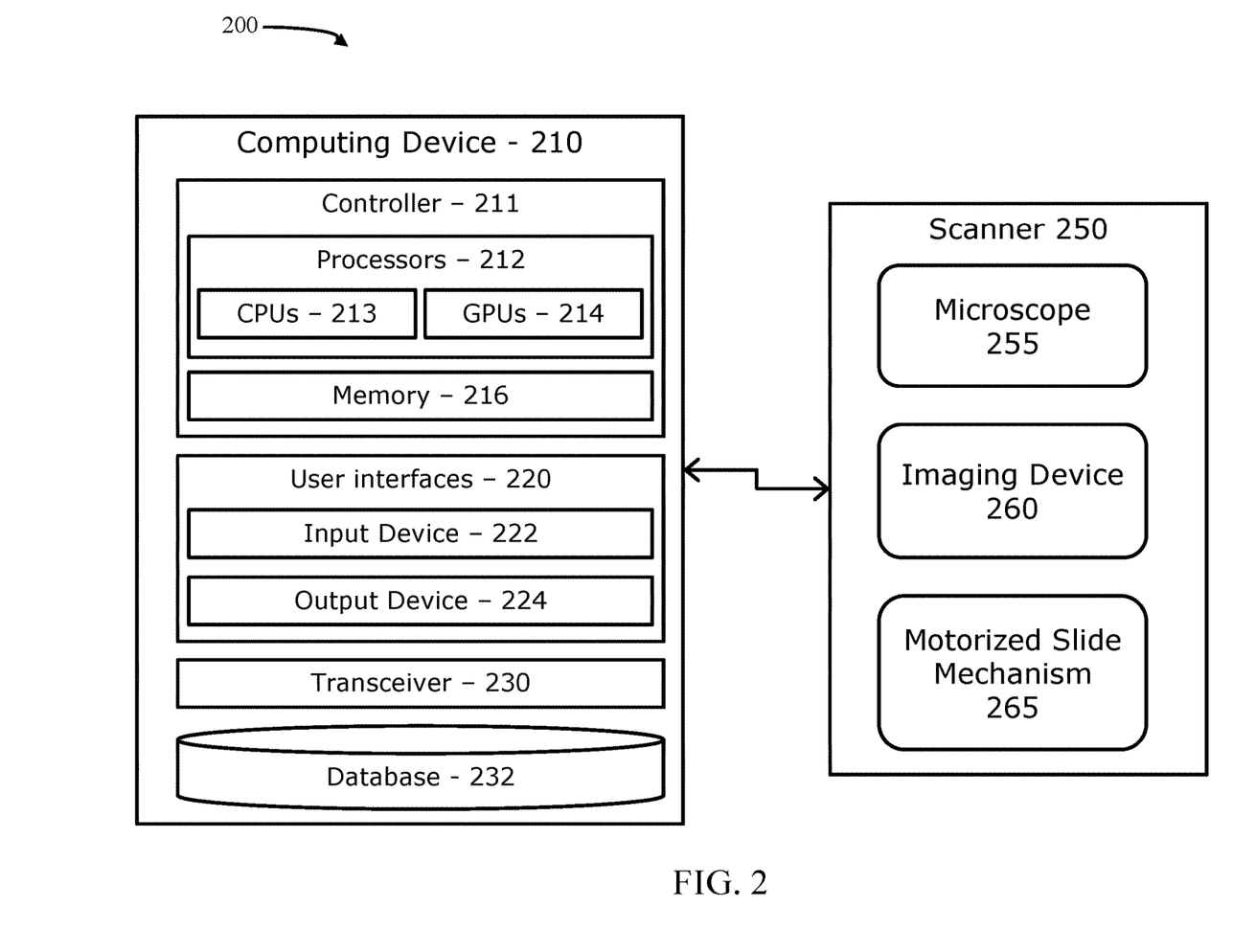
FIG. 2 depicts an example system for implementing the disclosed approach, according to various potential embodiments.

To address these bottlenecks, a scalable system has been developed from ground up for processing WSIs. Referring to FIG. 2, a system 200 may include a computing device 210 (or multiple computing devices, co-located or remote to each other) and a scanner 250. The scanner 250 may include one or more microscopes 255 (e.g., a light microscope with lenses), imaging device 260 (e.g., one or more digital cameras), and motorized slide mechanism 265 (with, e.g., motors capable of receiving a slide and moving it as each portion thereof is imaged by imaging device 260). In various implementations, one or more of the microscope 255, the imaging device 260, and/or the motorized slide mechanism 265 may be separate distinct devices not integrated into one scanner 250. In certain implementations, computing device 210 (or components thereof) may be integrated with one or more of the microscope 255, the imaging device 260, and/or the motorized slide mechanism 265. The computing device 210 (or multiple computing devices) may be used to control and/or receive signals acquired via scanner 250, and/or via components of scanner 250.

The computing device 210 may include a controller 211 with one or more processors 212 (e.g., one or more CPUs 213 and one or more GPUs 214) and one or more volatile and non-volatile memories 216 for storing computing code and data (e.g., images) that are read, captured, acquired, recorded, and/or generated. Memory 216 may comprise one or more CPU memories, one or more GPU memories, and various other memory modules. The controller 211 is configured to exchange control signals with scanner 250 or components thereof, allowing the computing device 210 to be used to control the capture of images and/or signals via the sensors thereof. One or more user interfaces 220 allow the computing device 210 to receive user inputs via one or more input devices 222 (e.g., one or more keyboards, touchscreens, microphones, cameras, etc.), and provide outputs via one or more output devices 224 (e.g., display screens, audio speakers, etc.). The computing device 210 may also include a transceiver 230 that allows the computing device 210 to exchange readings, control commands, and/or other data with scanner 250 (or components thereof), and/or one or more co-located or remote computing devices, wirelessly or via wires. The computing device 210 may additionally include one or more databases 232 for storing, for example, images captured using scanner 250. In some implementations, database 232 (or portions thereof) may alternatively or additionally be part of another computing device that is co-located or remote and in communication with computing device 210 and/or scanner 250 (or components thereof).

Potential embodiments use parallel processing on both CPUs and GPUs, and decode images on GPUs, with reads that are unbuffered and thereby have a low memory footprint. With unbuffered reads, a fixed number of bytes is not read and stored in memory for each tile read; this approach saves on both disk reading time and memory space. An unbuffered tile read involves a) seeking the position of the tile in the WSI, and b) reading the number of bytes containing the tile (each tile could be of different size in bytes, the exact number of bytes containing the tile may be read and no more). This may be implemented in part by extracting the offsets for where to seek and how many bytes to read for each tile. In various implementations, this is performed only once for a WSI (there could be 20,000 to 30,000 tiles in each WSI). For example, if tiles are about 4 KB each, around 4 KB of memory space is used, rather than, say, 16 MB for each tile. The reduction in memory usage for tiles frees up memory for more slides and processing thereof.

Figure 4A:
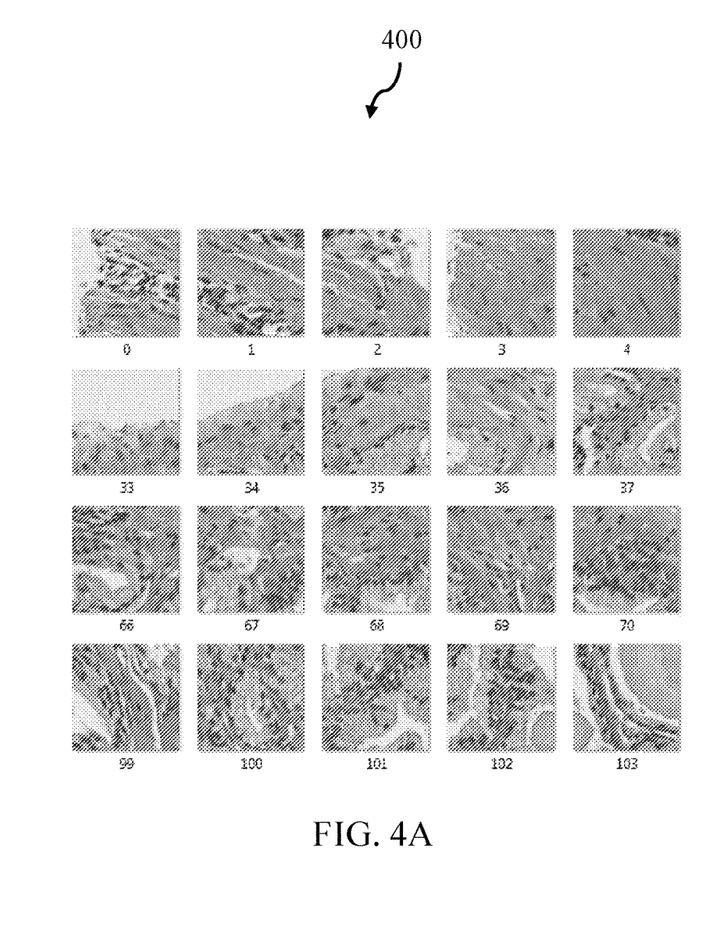
FIG. 4 illustrates a hypothetical mapping of a digital image to a set of tiles and, for each tile, a position and a number of bytes, according to various potential embodiments.
Figure 4B:
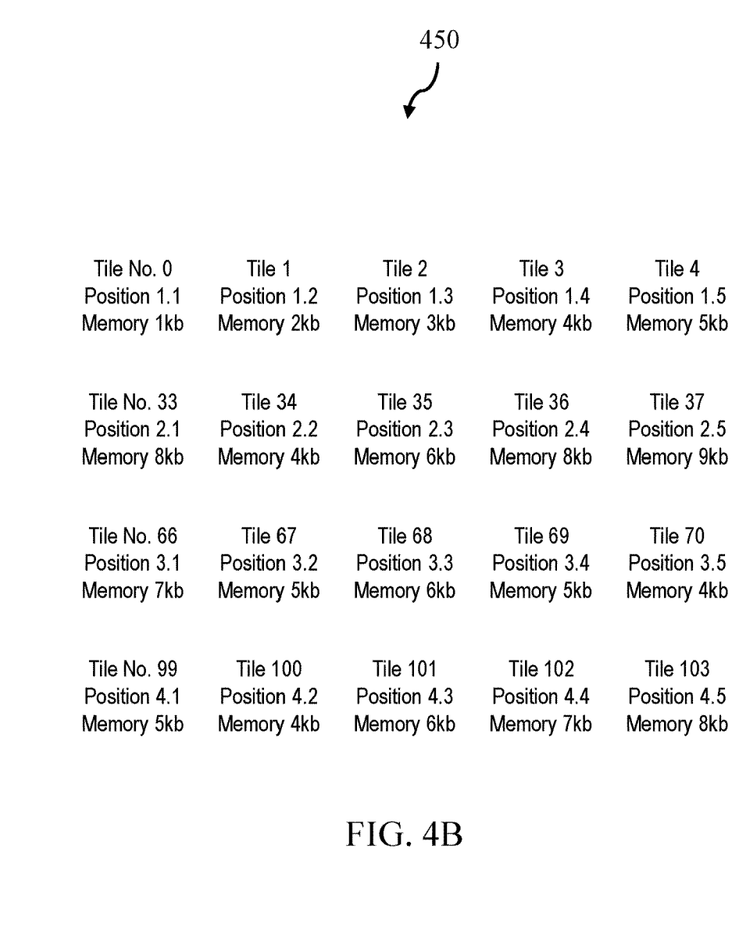
Figure 5:
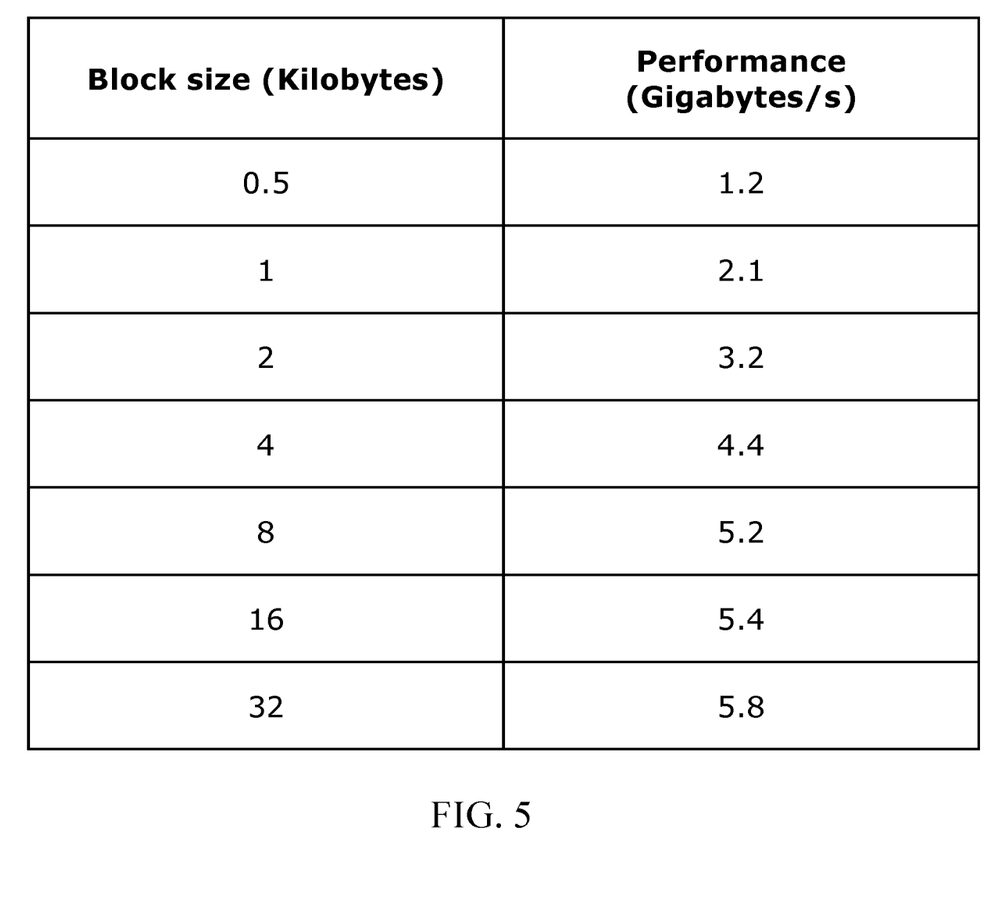
FIGS. 5 and 6A-D illustrate how disk performance could be improved by increasing the size of each native tile according to various potential embodiments, with FIG. 5 providing an example set of block sizes and corresponding performance metrics, and FIGS. 6A-D depicting different numbers of tiles according to various potential embodiments.
Figure 6A:
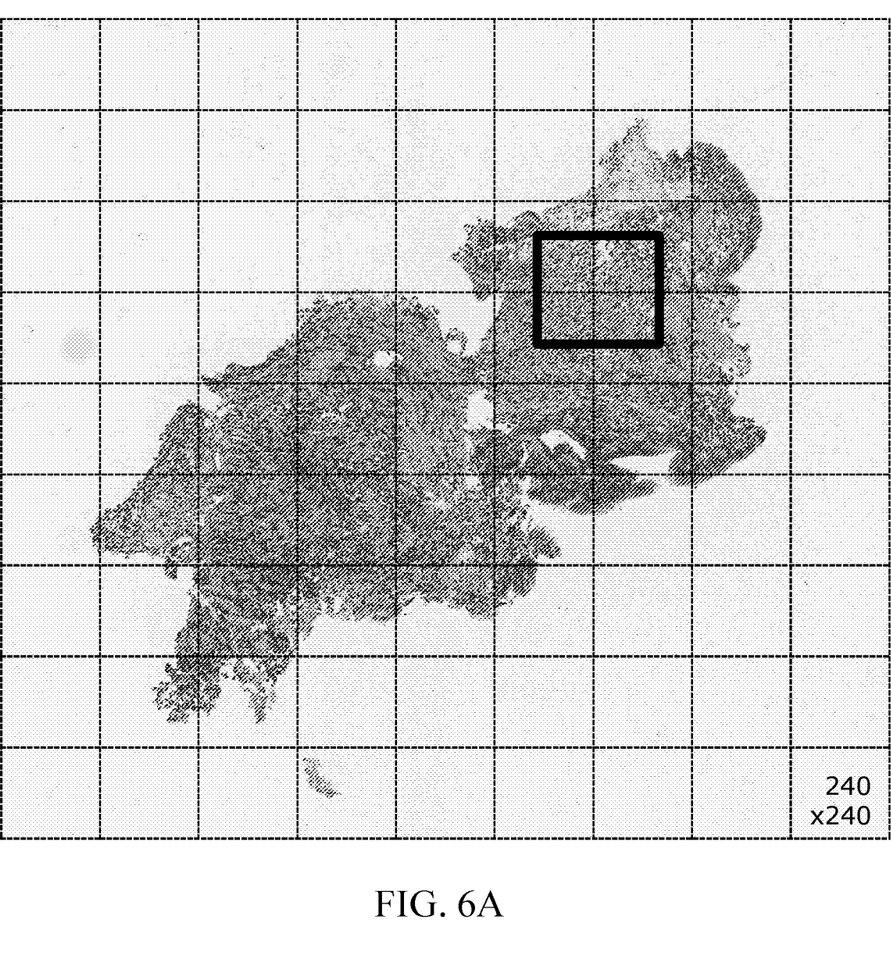
Figure 6B:
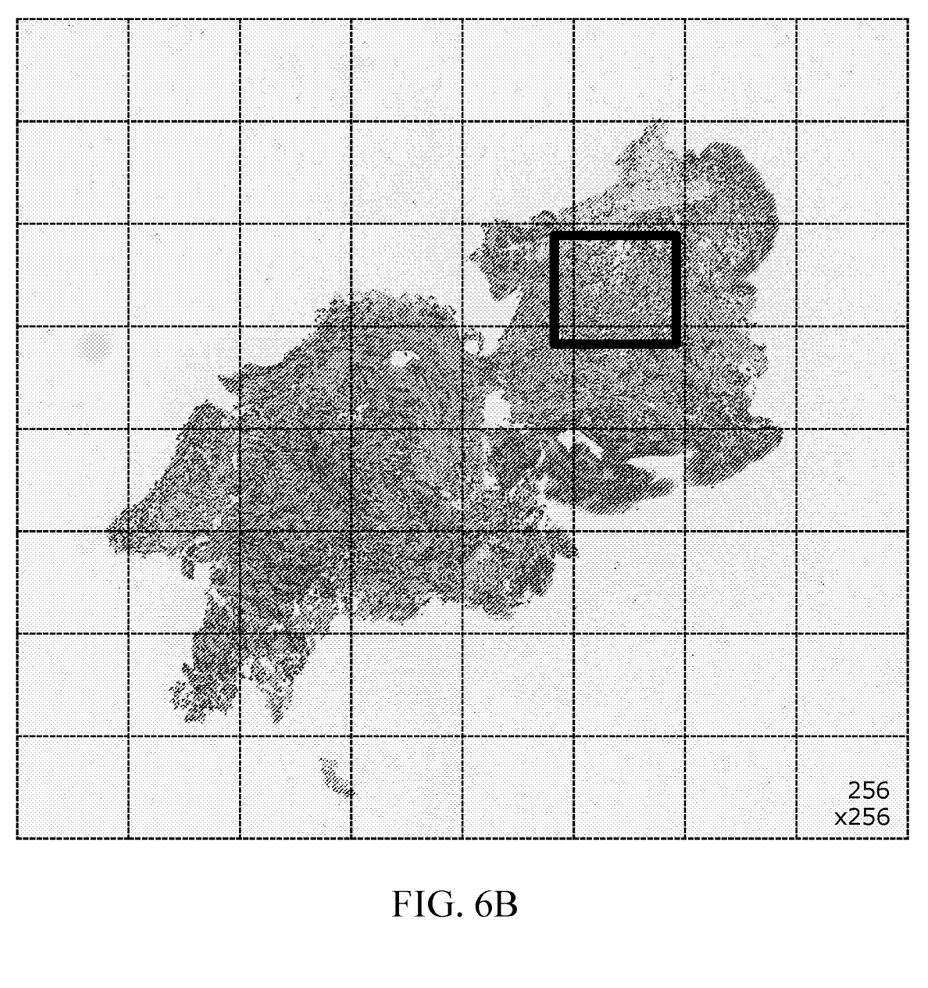
Figure 6C:
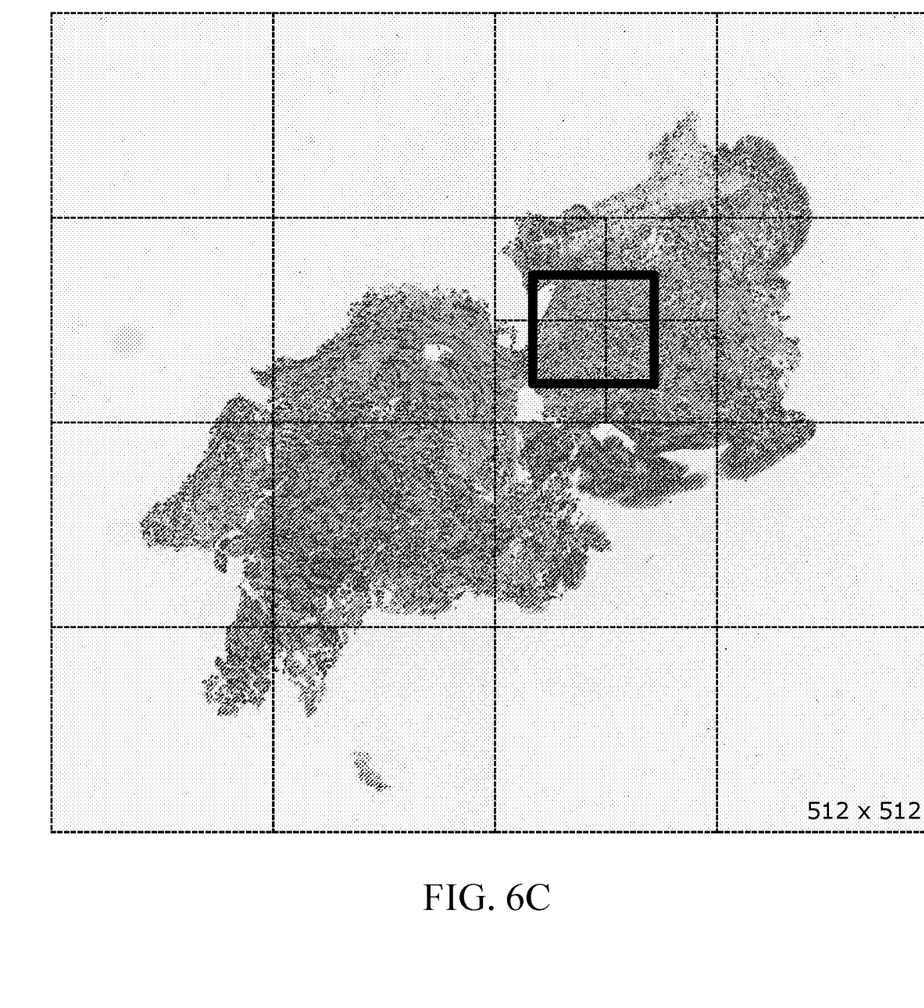
Figure 6D:
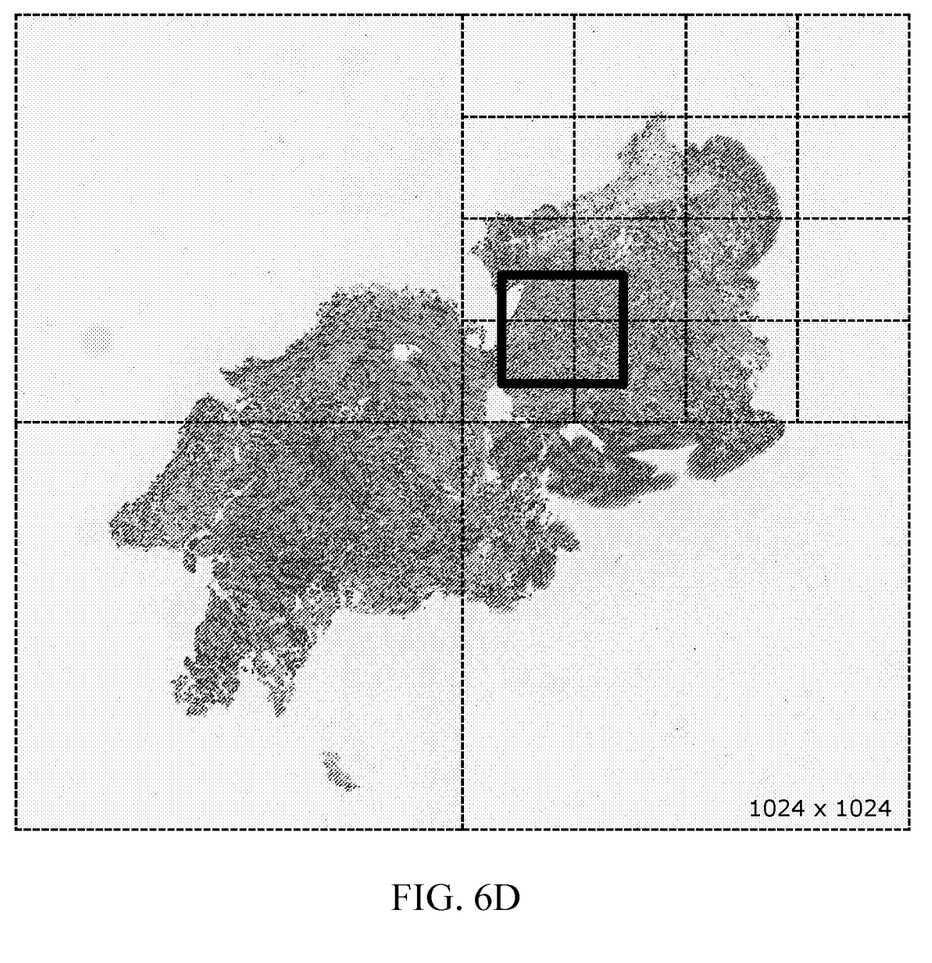

This is illustrated in the hypothetical of FIGS. 4A and 4B. In FIG. 4A, a region of interest 400 includes a subset of tiles in a WSI. Region 400 includes tiles 0, 1, 2, 3, 4, 33, 34, 35, 36, 37, 66, 67, 68, 69, 70, 99, 100, 101, 102, and 103. Referring to FIG. 4B, mapping 450, which may be extracted or generated, in advance, for the entire WSI, indicates for each tile in region 400 a position (e.g., offset) of the tile and how many bytes required for the tile. In the hypothetical values of FIG. 4B, tile 34 has position "2.2" and requires 4 kilobytes ("kb") of memory.

Deep learning applications may work in batches of random tiles; true random access to any tile in any WSI among a set of slides may thus be required. It may not be feasible to, say for example, completely open and read 20,000 slides and all their tiles at once and use a random tile among them for a deep learning algorithm. Further, the need for buffering in viewer applications may also be eliminated. For example, if only the portion of the WSI that a pathologist is looking at any point in time is loaded, the need for network and memory resources to run the viewer applications can be drastically reduced, thereby improving user experience.

All the native tiles (which may be separately captured using imaging device 260) can also be joined to generate a seamless image without decoding and re-encoding, reducing or eliminating blurs and artifacts and reducing computational demands. There is no need to re-encode each tile into a set standard where the original tile format can be directly decoded. For example, where OpenSlide may be able to read about 100 images per second, in example embodiments, the disclosed approach may be able to read around 10,000 images per second.

In various implementations, each operation (e.g., a calculation) that could work faster through GPU parallelization may have a customized CUDA operation written for it. For example, operations such as reading metadata headers of a WSI takes longer when only processed on CPU, so paralleling the necessary operations, and eliminating operations that are only meant to be used for specific purposes, improves overall efficiency. Through custom CUDA operations, the disclosed approach reduces or eliminates many inefficiencies in traditional WSI processing libraries. This is at least in part because each stage of the WSI read process can be independently parallel on both the CPU and the GPU. In example embodiments, this can be thought of as a queue; as soon as a few tiles are read in a first hypothetical stage of operations, the tiles may be pushed into a queue to be joined and decoded in a second stage. The first stage will continue reading tiles and filling the queue, while stage 2 will fetch tiles from the queue and join and/or decode them at the same time, independent of whether the first stage is running. Scheduling of CPU and GPU resources may be managed by an operating system of the computing system.

WSIs can thus more quickly be read, processed, and viewed, achieving substantial improvements and efficiencies. Potential embodiments also provide advantages for algorithm and application development, provide a better way to handle editing of WSIs, and provide insights into optimizing various parts in the algorithm development pipeline. Faster reads and faster processing of iterations improve overall throughput of the system many fold. Lower memory consumption can help ensure larger datasets can be processed with reasonable resource availability. The system is customizable as needed for different applications.

This is specific to application, such as a specific class of deep learning algorithms. For example, convolutional neural networks may work by looking at multiple sets of small portions of WSIs at a time and come to a decision about the presence of a tumor. In contrast, pathologists almost always never look at such small portions, instead they look at larger portions of the tissue to come to a decision on tumor presence. Performance bottlenecks are commonly cited as the reason larger patches are not used. The disclosed approach can make it possible to efficiently retrieve larger tissue patches and improve overall accuracy of the algorithm in addition to its speed. If speed is not a bottleneck, such deep learning algorithms can be run longer and tuned with different variations of parameters to improve accuracy. For example, FIGS. 5 and 6A-6D illustrate how disk performance could be improved by increasing the size of each native tile, a further performance consideration in analyses that may be performed using the disclosed system. For example, tile size may be increased (e.g., from 240 to 1024) to be optimal both for the viewer and deep learning applications.

It is noted that even in a hypothetical system with unlimited RAM, OpenSlide could load more WSIs at once, but it would nonetheless be slow, because of the speed of each OpenSlide read region operation. Consequently, in various embodiments, reads could be buffered, and the disclosed approach could nonetheless outperform OpenSlide and improve performance.

Figure 3:
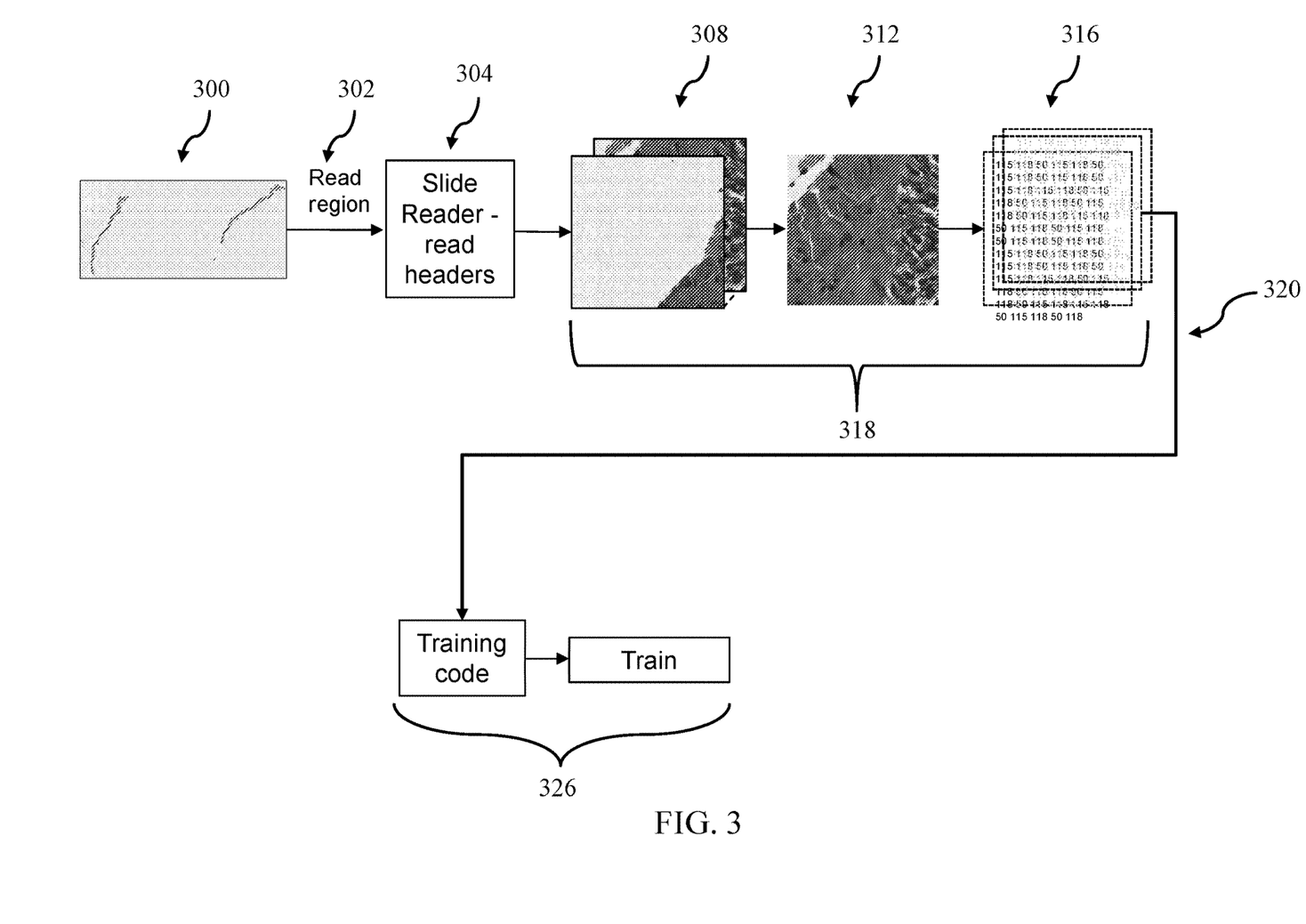
FIG. 3 depicts an example process for implementing the disclosed approach, according to various potential embodiments.
Figure 7:
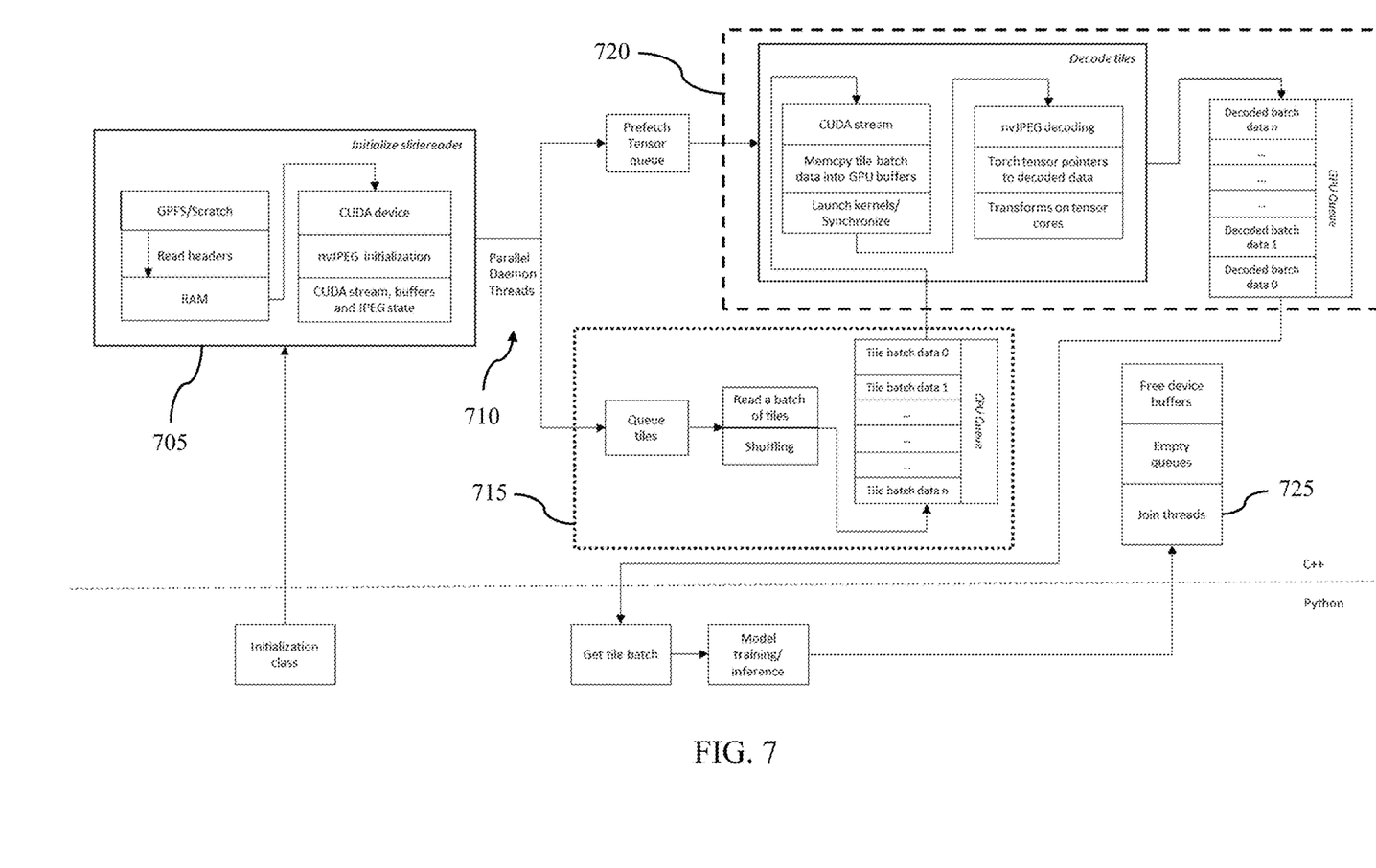
FIG. 7 depicts an example process for implementing the disclosed approach, according to various potential embodiments.

With reference to FIGS. 3 and 7: a read region 302 (i.e., the region to be read) of WSI 300 is fed to a slide reader 304. The slide reader 304 reads headers (see also 705 in FIG. 7) and performs process 318 to generate a batch of tensors 320. The unbuffered native tile reads are read into memory at 308 (see also 715 at FIG. 7). This may be performed without decoding, painting onto surface, addition of alpha channel, re-encoding, and fixing of seams (see FIG. 1). The native tile reads are (optionally) joined (see also 725 in FIG. 7) into the region to be read in memory at 312. After being joined in memory at 312, batch decoding and indexing of regions are performed at 316 (see also 720 in FIG. 7). Every stage of process 318 may be independently parallel on both CPUs and GPUs (see 710 in FIG. 7). The batch of tensors 320 is used for training of algorithms (e.g., neural networks) at 326.

Figure 8:
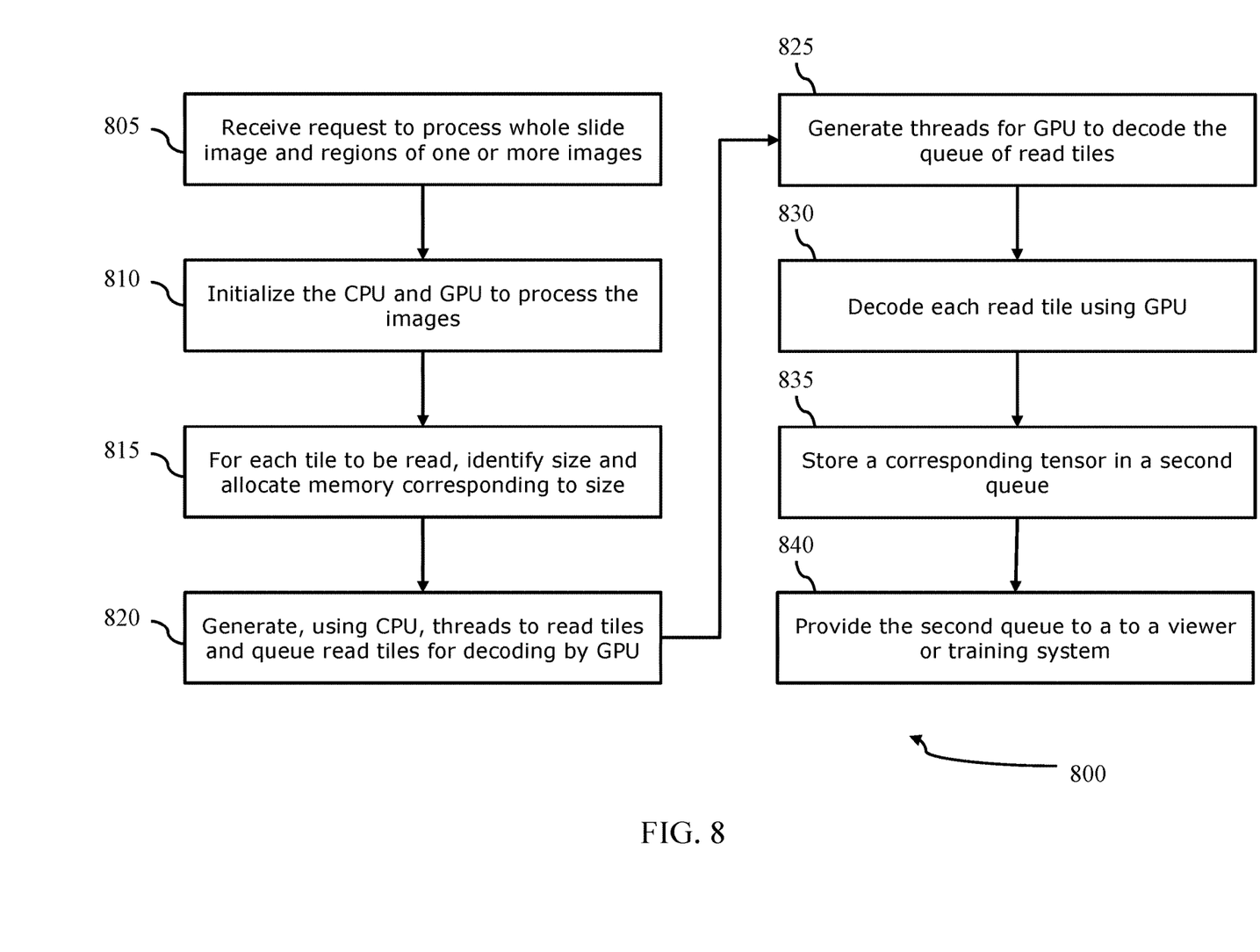
FIG. 8 depicts an example flowchart for implementing the disclosed approach, according to various potential embodiments.

With reference to FIG. 8, an example process 800 may begin by receiving a request to process a data set of whole slide images and a plurality of regions of one or more images (805). The request may be received by a system (e.g., system 200) comprising a CPU (e.g., CPUs 213) and a GPU (e.g., GPUs 214). The request may be generated when a user is viewing (using, e.g., output device 224) a digital image on a slide viewer (which may be running on, e.g., computing device 210) and the user indicates (via, e.g., an input device 222) that he or she wishes to access a certain region of the image. The request may also be generated if, for example, a user provides a dataset identifying one or more regions of one or more slides to be used to train a model. The whole slide image being viewed may have been captured, for example, via a scanner (e.g., scanner 250). For example, the whole slide image may be a digital image of a tissue sample on a slide that is imaged using a microscope 255 and an imaging device 260 (while, e.g., the slide is moved using a motorized slide mechanism 265).

The process may next initialize the CPU and GPU (see, e.g., 705 in FIG. 7) to process the data set (810). The data set may be processed to generate a plurality of tensors. As used herein, a tensor is a mathematical representation of a digital image or portion thereof. The tensors may be used, for example, to train models and/or may be used to generate digital images for viewing using a slide viewer.

The CPU and GPU may be initialized by, for example, controller 211. The CPU and GPU may be initialized by retrieving a first image of the one or more images. The CPU and GPU may further be initialized by generating a mapping (see, e.g., FIG. 4) of the first image. The mapping (see, e.g., FIG. 4) may comprise a set of tiles and, for each tile, a position indicator and a memory size indicator. The CPU and GPU may further be initialized identifying, from the request, an indication of a region of interest (ROI) of the image to be processed. The ROI may comprise a subset of the set of tiles.

Process 800 may proceed to generate threads to read tiles and queue the read tiles to be decoded (820). The tiles may be read in their native (not decoded) format. Reading of tiles may correspond to, for example, step 308 in FIG. 3 and/or 715 in FIG. 7. The plurality of threads may be generated by the CPU, while the decoding may be performed by the GPU. Parallel processing through generation of threads may correspond to, for example, 710 in FIG. 7 ("Parallel Daemon Threads").

For each tile that is to be read, process 800 may include identifying a size of the tile and allocating, in the memory of the CPU (e.g., memory 216), a portion of the memory corresponding to the size of the tile (815). The size (corresponding to the amount of memory that would be needed to store the tile) may be identified via a mapping that was previously generated (see, e.g., FIG. 4). Allocating a portion of memory corresponding to the size of the tile corresponds with reading tiles in an unbuffered manner. That is, rather than, for example, reserving a fixed amount of memory for each tile (e.g., a maximum amount of memory that could be required by the tile, such as 16 megabytes), or otherwise reserving more space in memory than is needed for a particular tile (i.e., more than the actual size of the tile), an unbuffered read may allocate only the amount of memory needed for the tile (as may be determined by a mapping (see FIG. 4).

Process 800 may comprise generating a plurality of threads to decode the queue of read tiles generated by the CPU (825). The threads may be generated by the CPU but may be performed by the GPU.

Process 800 may comprise decoding each read tile included in the queue of read tiles according to a prefetching policy (830). As the user provides all the regions that needs to be read in advance, the process will read and decode a plurality of tiles and push them into a queue, so when the user requests the regions they will be provided to the user with the least minimum lag possible. Queue size is dynamically maintained based on the availability of free GPU and CPU memory. Decoding may be performed by the GPU, which may decode more efficiently than the CPU. The queue storing tiles read is stored on CPU memory and the queue storing decoded tensors is maintained in the GPU memory.

Process 800 may comprise storing, in a second queue, for each decoded tile, a corresponding tensor (835). The tensor may be stored by the GPU.

Process 800 may comprise providing, to a viewer or a training system, the second queue including the plurality of decoded tiles (840). The second queue may be provided by the GPU.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the terms "exemplary," "example," "potential," and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the Figures. It should be noted that the orientation of various elements may differ according to other exemplary embodiments, and that such variations are intended to be encompassed by the present disclosure.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:
   receiving, by a system comprising a central processing unit (CPU) and a graphics processing unit (GPU), a request to process a data set of whole slide images and a plurality of regions of one or more images;
   initializing the CPU and GPU to process the data set by:
      retrieving, by the system, a first image of the one or more images;
      generating, by the system, a mapping of the first image, the mapping comprising a set of tiles and, for each tile, a position indicator and a memory size indicator; and
      identifying, by the system, from the request, an indication of a region of interest (ROI) of the image to be processed, the ROI comprising a subset of the set of tiles;
   generating, by the CPU, a plurality of threads to read tiles and queue the read tiles to be decoded by the GPU;
   for each tile to be read, identifying a size of the tile and allocating, in the memory of the CPU, a portion of the memory corresponding to the size of the tile;
   generating, for the GPU, a plurality of threads to decode the queue of read tiles generated by the CPU;
   decoding, by the GPU, each read tile included in the queue of read tiles according to a prefetching policy;
   storing, by the GPU, in a second queue, for each decoded tile, a corresponding tensor; and
   providing, by the GPU, to a viewer or a training system, the second queue including the plurality of decoded tiles.

2. The method of claim 1, wherein the plurality of threads are generated to read the tiles in an unbuffered manner.

3. The method of claim 2, wherein reading the tiles in the unbuffered manner comprises allocating only the portion of the memory corresponding to the size of the tile.

4. The method of claim 1, wherein the identifying the size of the tile comprises identifying the size of the tile based on a corresponding memory size indicator in the mapping.

5. The method of claim 1, wherein the first image is retrieved from a scanner.

6. The method of claim 5, wherein the scanner comprises an imaging device and a microscope.

7. The method of claim 1, wherein the image is a digital image, captured using an imaging device and a microscope, of a slide with tissue of a subject.

8. A system comprising a central processing unit (CPU), a graphics processing unit (GPU), and a memory with executable instructions configured to cause the system to:
   receive, by the CPU, a request to process a data set of whole slide images and a plurality of regions of one or more images;
   initialize the CPU and GPU to process the data set by:
      retrieving a first image of the one or more images;
      generating a mapping of the first image, the mapping comprising a set of tiles and, for each tile, a position indicator and a memory size indicator; and
      identifying, from the request, an indication of a region of interest (ROI) of the image to be processed, the ROI comprising a subset of the set of tiles;
   generate, by the CPU, a plurality of threads to read tiles and queue the read tiles to be decoded by the GPU;
   for each tile to be read, identify a size of the tile and allocate, in the memory of the CPU, a portion of the memory corresponding to the size of the tile;
   generate, for the GPU, a plurality of threads to decode the queue of read tiles generated by the CPU;
   decode, by the GPU, each read tile included in the queue of read tiles according to a prefetching policy;
   store, by the GPU, in a second queue, for each decoded tile, a corresponding tensor; and
   provide, by the GPU, to a viewer or a training system, the second queue including the plurality of decoded tiles.

9. The system of claim 8, wherein the plurality of threads are generated to read the tiles in an unbuffered manner.

10. The system of claim 9, wherein reading the tiles in the unbuffered manner comprises allocating only the portion of the memory corresponding to the size of the tile.

11. The system of claim 8, wherein the identifying the size of the tile comprises identifying the size of the tile based on a corresponding memory size indicator in the mapping.

12. The system of claim 8, wherein the first image is retrieved from a scanner.

13. The system of claim 12, wherein the scanner comprises an imaging device and a microscope.

14. The system of claim 8, wherein the image is a digital image, captured using an imaging device and a microscope, of a slide with tissue of a subject.

15. A non-transitory computer-readable storage medium comprising computer-executable instructions configured to cause a system comprising a central processing unit (CPU) and a graphics processing unit (GPU) to:
   receive, by the CPU, a request to process a data set of whole slide images and a plurality of regions of one or more images;
   initialize the CPU and GPU to process the data set by:
      retrieving a first image of the one or more images;
      generating a mapping of the first image, the mapping comprising a set of tiles and, for each tile, a position indicator and a memory size indicator; and identifying, from the request, an indication of a region of interest (ROI) of the image to be processed, the ROI comprising a subset of the set of tiles;

generate, by the CPU, a plurality of threads to read tiles and queue the read tiles to be decoded by the GPU;

for each tile to be read, identify a size of the tile and allocating, in the memory of the CPU, a portion of the memory corresponding to the size of the tile;

generate, for the GPU, a plurality of threads to decode the queue of read tiles generated by the CPU;

decode, by the GPU, each read tile included in the queue of read tiles according to a prefetching policy;

store, by the GPU, in a second queue, for each decoded tile, a corresponding tensor; and provide, by the GPU, to a viewer or a training system, the second queue including the plurality of decoded tiles.

16. The medium of claim 15, wherein the plurality of threads are generated to read the tiles in an unbuffered manner by allocating only the portion of the memory corresponding to the size of the tile.

17. The medium of claim 15, wherein the identifying the size of the tile comprises identifying the size of the tile based on a corresponding memory size indicator in the mapping.

18. The medium of claim 15, wherein the first image is retrieved from a scanner.

19. The medium of claim 18, wherein the scanner comprises an imaging device and a microscope.

20. The medium of claim 15, wherein the image is a digital image, captured using an imaging device and a microscope, of a slide with tissue of a subject.

* * * * *